R. P. HERON & E. SABO.
CASTER.
APPLICATION FILED DEC. 29, 1909.
1,099,044.
Patented June 2, 1914.
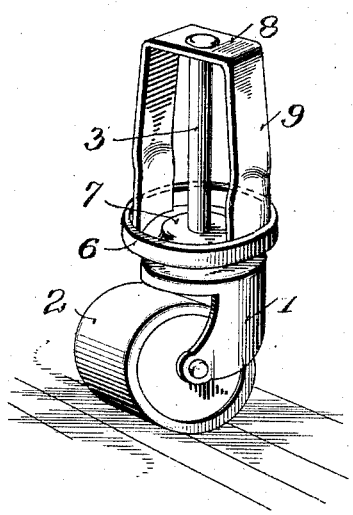
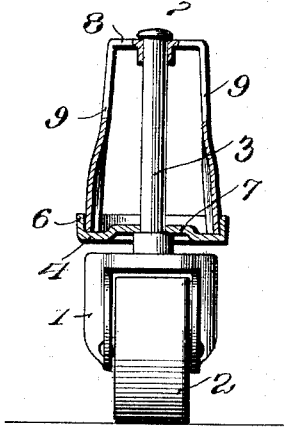
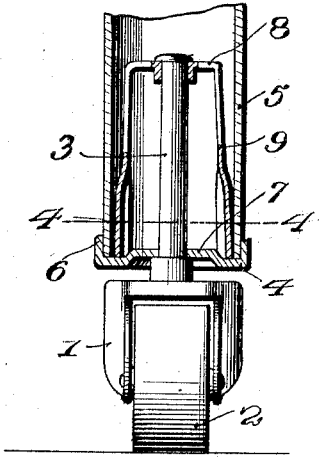
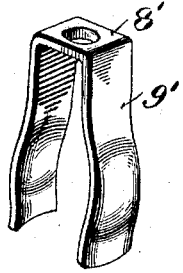
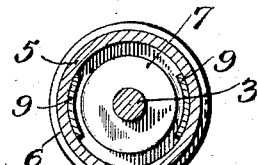
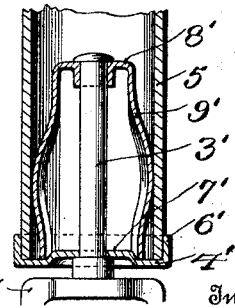
Witnesses
W. A. Williams
Henderson F. Hill
Inventors
Robert P. Heron
Edmund Sabo
By Robertson & Johnson
Attorneys

UNITED STATES PATENT OFFICE.

ROBERT P. HERON AND EDMUND SABO, OF SYRACUSE, NEW YORK.

CASTER.

1,099,044. Specification of Letters Patent. Patented June 2, 1914.

Application filed December 29, 1909. Serial No. 535,482.

*To all whom it may concern:*

Be it known that we, ROBERT P. HERON and EDMUND SABO, citizens of the United States, and residents of Syracuse, in the county of Onondaga and State of New York, have invented certain new and useful Improvements in Casters, of which the following is a specification.

Our invention relates to casters and has reference more particularly to casters designed for use in tubular legs. In casters of this character it is customary to use spring frames and it has been found desirable to limit the extent to which the free ends of such frames may be compressed. In an application filed by us of even date herewith and generic with respect to this application we have described novel means for accomplishing this purpose.

In the present application we show a caster for tubular legs having a leg supporting disk or plate whose edge is turned up to form an external centering means for the tubular leg and to prevent the leg from slipping off the disk, and which has a raised center which limits the inward movement of the free ends of an inverted U-shaped spring retaining frame to prevent the frame from being unduly compressed.

The invention also relates to a spring of special configuration.

Our invention therefore consists in the caster, an embodiment of which is illustrated and described herein, and which is more particularly pointed out in the appended claims.

Referring to the drawings: Figure 1 is a perspective view of a caster embodying our invention. Fig. 2 is an elevation, the parts with which the invention particularly deals being shown in section. Fig. 3 is a view similar to Fig. 2, the caster however being shown in place within the tubular leg. Fig. 4 is a cross section on the line 4—4, Fig. 3. Fig. 5 is a view of a modification of the invention in which we employ a spring of special shape, the caster being shown partially inserted into the end of the tubular leg. Fig. 6 is a perspective view of the modified spring.

Referring to Figs. 1 to 4: 1 is the horn of the caster in which the caster wheel 2 is mounted rotatably in the usual manner. 3 is the pintle secured to the horn. 4 is the leg supporting disk or plate having a turned up edge 6 adapted to coact with the exterior of the tubular leg 5 for the purposes stated. This disk or plate 4 has a raised center which is preferably stamped up therefrom and thus stiffens the disk. But other modes of producing a center higher than the adjacent part of the disk, as casting, may be employed. The retaining means consists of an inverted U-shaped spring frame whose closed end 8 is located adjacent the free end of the pintle and which is provided with legs 9 extending downward therefrom the whole forming, as stated, an inverted U. The ends of the legs are curved as shown in the figures specified to conform to the curvature of the interior of the tubular leg and extend down within the turned up edge 6 and between it and the raised center 7, the ends thus being located to coact with the raised center to prevent them from being unduly compressed.

Referring to Figs. 5 and 6, it will be noted that similar elements to which primed reference numerals will be given are present as follows: 4' is the leg supporting disk or plate having the turned up edge 6' and the raised center 7' and surrounding the pintle 3'. The structure differs from that above explained and illustrated in the earlier figures only in the configuration of the spring frame. This frame like that shown in the earlier figures has its closed end 8' adjacent the free end of the pintle. This end is preferably narrow for ready insertion into the tubular leg. The legs 9' of the frame extend downward and outward and then inward and are provided somewhat above their free ends with curved protuberances each leg being curved both lengthwise and crosswise. The protuberances thus formed are effective for coaction with the interior of the tubular leg to retain the caster removably in place, and enable the end of the frame to be made narrower. This form of spring is found advantageous since it permits the ready insertion of the caster and exerts a more powerful gripping action upon the interior of the tubular leg.

What we claim as our invention is:—

1. A caster for tubular legs having in combination with a wheel, horn and pintle, a leg supporting plate provided with means to coact with the exterior of the tubular leg to center the same and with stops within said means, and an inverted U-shaped spring frame the free ends of whose legs, terminating above said leg supporting plate, extend lengthwise of the tubular leg and are located within said means and outside said stops whereby their inward movement is limited by the latter.

2. A caster for tubular legs having in combination with a wheel, horn and pintle, a leg supporting plate having its edge turned up to coact with the exterior of the tubular leg and provided with a raised center, and an inverted U-shaped spring frame the free ends of whose legs are located within the turned up edge and between it and the raised center the latter constituting means to limit the inward movement of the legs.

Signed by us at Syracuse, New York, this 29th day of October, 1909.

ROBERT P. HERON.
EDMUND SABO.

Witnesses:
RAE E. KAPLAN,
FRANK R. LENNOX.

Copies of this patent may be obtained for five cents each, by addressing the "Commissioner of Patents, Washington, D. C."